United States Patent
Wood et al.

(10) Patent No.: US 7,134,219 B2
(45) Date of Patent: Nov. 14, 2006

(54) FIBER OPTIC GAP GAUGE

(75) Inventors: Billy E. Wood, Livermore, CA (US);
Scott E. Groves, Brentwood, CA (US);
Greg J. Larsen, Brentwood, CA (US);
Roberto J. Sanchez, Pleasanton, CA (US)

(73) Assignee: The Regents of the University of California, Oakland, CA (US)

( * ) Notice: Subject to any disclaimer, the term of this patent is extended or adjusted under 35 U.S.C. 154(b) by 0 days.

(21) Appl. No.: 11/132,976

(22) Filed: May 18, 2005

(65) Prior Publication Data

US 2005/0257392 A1 Nov. 24, 2005

Related U.S. Application Data

(60) Provisional application No. 60/573,260, filed on May 21, 2004.

(51) Int. Cl.
*G01D 21/00* (2006.01)
(52) U.S. Cl. ........................................................ 33/613
(58) Field of Classification Search .................. 33/613
See application file for complete search history.

(56) References Cited

U.S. PATENT DOCUMENTS 2,350,073 A * 5/1944 Simmons, Jr. .......... 33/DIG. 13
3,097,433 A * 7/1963 Cubberly, Jr. .............. 33/544.3
5,396,966 A * 3/1995 Roos et al. .................... 175/45
6,848,189 B1 * 2/2005 Moake et al. .................. 33/544

* cited by examiner

Primary Examiner—Christopher W. Fulton
(74) Attorney, Agent, or Firm—James S. Tak; Alan H. Thompson

(57) ABSTRACT

A lightweight, small size, high sensitivity gauge for indirectly measuring displacement or absolute gap width by measuring axial strain in an orthogonal direction to the displacement/gap width. The gap gauge includes a preferably titanium base having a central tension bar with springs connecting opposite ends of the tension bar to a pair of end connector bars, and an elongated bow spring connected to the end connector bars with a middle section bowed away from the base to define a gap. The bow spring is capable of producing an axial strain in the base proportional to a displacement of the middle section in a direction orthogonal to the base. And a strain sensor, such as a Fabry-Perot interferometer strain sensor, is connected to measure the axial strain in the base, so that the displacement of the middle section may be indirectly determined from the measurement of the axial strain in the base.

27 Claims, 2 Drawing Sheets

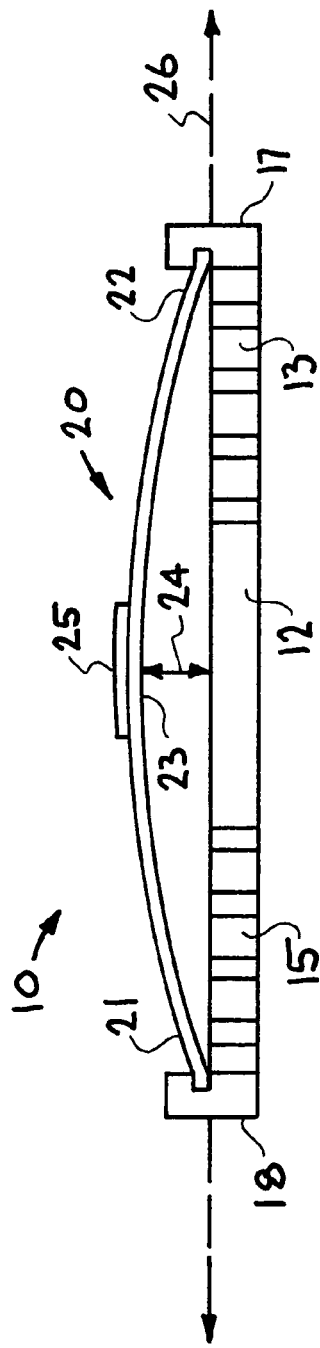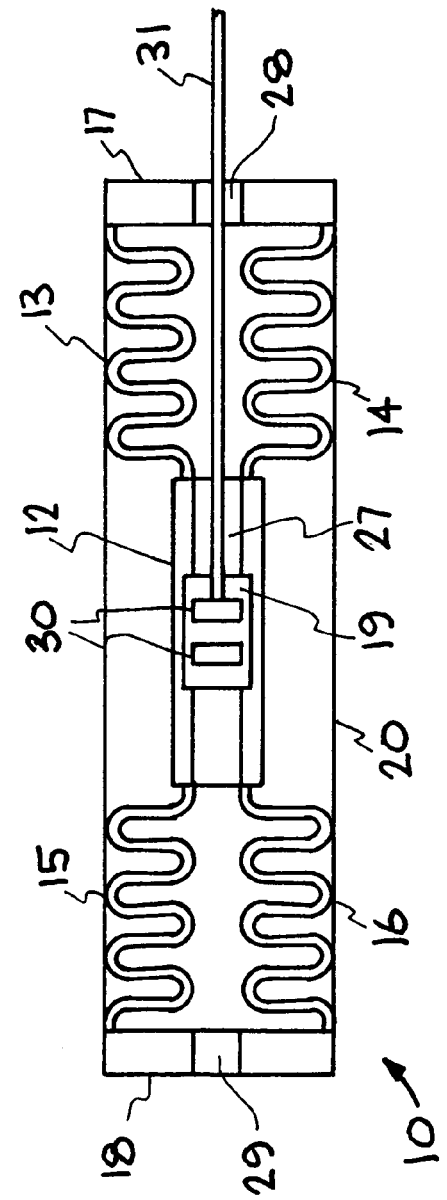

FIBER OPTIC GAP GAUGE

I. CLAIM OF PRIORITY IN PROVISIONAL APPLICATION

This application claims priority in provisional application No. 60/573,260, filed on May 21, 2004, entitled "Fiber Optic Gap Gauge" by Billy E. Wood et al.

The United States Government has rights in this invention pursuant to Contract No. W-7405-ENG-48 between the United States Department of Energy and the University of California for the operation of Lawrence Livermore National Laboratory.

II. FIELD OF THE INVENTION

The present invention relates to gap gauges, and more particularly to a fiber optic gap gauge for indirectly measuring gap distances and displacements by measuring axial strains produced in an orthogonal direction to the gap being measured.

III. BACKGROUND OF THE INVENTION

Fiber optic sensors are known to have a number of beneficial properties over conventional electronic sensors, such as reduction/elimination of EMI susceptibility, electrical isolation with no electrical current/power at the sensing area, insensitivity to radiation, remote readout, no wires, robust, wide temperature range, small size for high fidelity measurements, and highly manufacturable and reproducible.

Various types of fiber optic sensors are commercially available based on a white light Fabry-Perot interferometric readout concept for measuring strain, temperature, etc. Such sensors are generally made by precisely positioning and attaching segments of optical fiber in tiny glass capillary tubes.

There is still a need, however, for a lightweight, high sensitivity gauge for gap width measurement which is capable of accurately sensing position, displacement, and gap width at the micrometer level with a micro sensor, while being small enough to fit the requirements of a restricted amount of space and achieving the other benefits associated with fiber optic sensors.

IV. SUMMARY OF THE INVENTION

One aspect of the present invention includes a gap gauge comprising: an elongated base having a pair of ends, and at least a portion of the base capable of resiliently biasing in an axial direction; an elongated bow spring having a pair of ends each connected to a corresponding one of the base ends, and a middle section bowed away from the base to define a gap therebetween, said bow spring capable of producing an axial strain in the base proportional to a displacement of the middle section in a direction orthogonal to the base; and a strain sensor connected to measure the axial strain in the base, whereby the displacement of the middle section may be indirectly determined from the measurement of the axial strain in the base.

Another aspect of the present invention includes a fiber optic gap gauge comprising: a base having an elongated tension bar with at least a segment thereof having a hollow cavity forming a reduced cross-sectional area, a pair of end connector bars adjacent opposite ends of the tension bar, and at least one spring connecting each end of the tension bar to a corresponding one of the end connector bars; an elongated bow spring having a pair of ends each connected to a corresponding one of the pair of end connector bars of the base, and a middle section bowed away from the base to define a gap therebetween, said bow spring capable of producing an axial strain in the tension bar proportional to a displacement of the middle section in a transverse direction to the base; and a fiber optic Fabry-Perot interferometer strain sensor located in the hollow cavity to measure axial strain along the segment of the tension bar with the reduced cross-sectional area, whereby the transverse displacement of the middle section may be indirectly determined from the measurement of the axial strain in the tension bar.

Another aspect of the present invention includes a gap gauge comprising: a base having a pair of ends, and at least a portion of the base capable of resiliently biasing in an axial direction; means having a focal point transversely spaced from the base to define a gap therebetween and a pair of arms connecting the focal point to the base ends, for producing a tensile force and an axial strain in the base proportional to a displacement of the focal point in a direction orthogonal to the base due to an applied force thereon; and a strain sensor connected to measure the axial strain in the base, whereby the orthogonal displacement of the fulcrum may be indirectly determined from the measurement of the axial strain in the base.

And another aspect of the present invention includes a gap gauge construction comprising: a base having a pair of ends, and at least a portion of the base capable of resiliently biasing in an axial direction; and means having a focal point transversely spaced from the base to define a gap therebetween and a pair of arms connecting the focal point to the base ends, for producing a tensile force and an axial strain in the base proportional to a displacement of the focal point in a direction orthogonal to the base due to an applied force thereon.

Generally, the gap gauge is capable of measuring on a microscale level the gap and/or relative displacement between two flat surfaces. The gap gauge includes an elongated base having a longitudinal axis, an elongated bow spring, and a strain sensor attached to measure an axial strain in the base. The bow spring has a pair of ends connected to opposite ends of the base with a middle section spaced from the base to form a gap. This arrangement operates to produce an axial strain in the base when a force is applied on the middle section of the bow spring. The applied force causes a transverse/orthogonal displacement of the middle section relative to the longitudinal axis, with the displacement being proportional to the axial strain. Thus, measuring the axial strain with the strain sensor enables an indirect determination of the transverse displacement and gap width. Moreover, because the gap gauge preferably uses a fiber optic strain sensor, the gauge is immune to electromagnetic interference, is intrinsically safe for high explosive applications, and can be remotely installed over a kilometer distance without a change in resolution or calibration. Thus it may be used in any gap gauge application requiring small size, no electrical connections, high sensitivity, absolute readout, long term stability over a wide temperature range, extremely long lead length using optical fiber in widespread use by the telecommunication industry and instrinsicially safe for hazardous and extreme environments. Furthermore, it can be incorporated and used in, for example, manufacturing systems, aerospace vehicles, structure monitoring systems, and medical devices, to name a few.

V. BRIEF DESCRIPTION OF THE DRAWINGS

The accompanying drawings, which are incorporated into and form a part of the disclosure, are as follows:

FIG. 2 is a side view of the fiber optic gap gauge of FIG. 1.

FIG. 3 is a bottom view of the fiber optic gap gauge of FIG. 1.

VI. DETAILED DESCRIPTION

Figure 1:
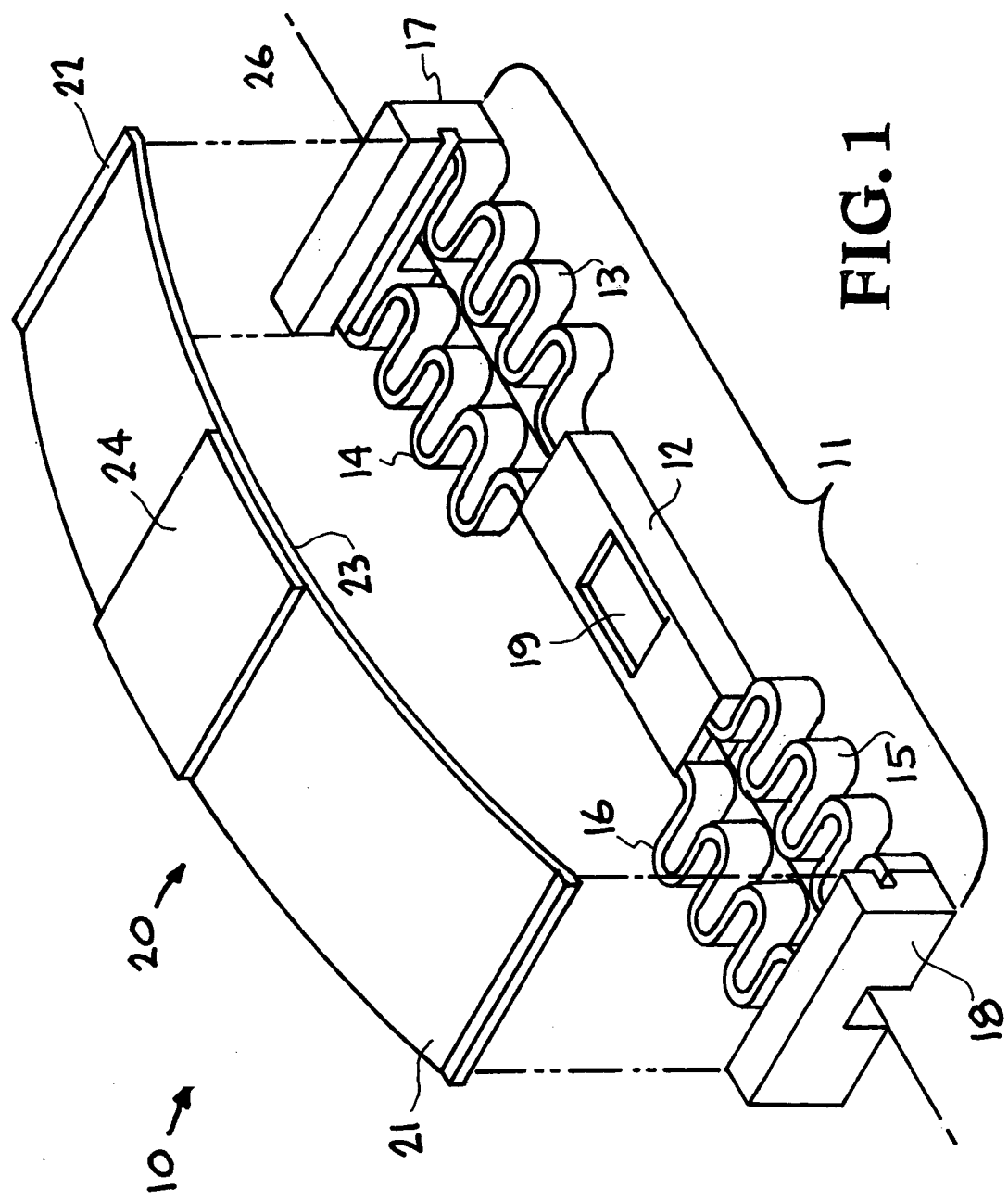
FIG. 1 is an exploded perspective view of a preferred embodiment of the fiber optic gap gauge of the present invention.

FIGS. 1–3 show a preferred embodiment of the gap gauge of the present invention, generally indicated at reference character 10, and including an elongated base 11 having a longitudinal axis 26, an elongated bow spring 20 having a pair of ends 21, 22 connected to opposite ends of the base, and a strain sensor 30 (FIG. 3) attached to measure an axial strain in the base. The gap gauge is suitably dimensioned for miniaturized, space restrictive applications. For example, a prototype developed by the inventors in research conducted for the Lawrence Livermore National Laboratory has been constructed to meet maximum dimensional requirements of 2 mm height by 11 mm length by 3 mm width.

The base 11 is shown having a centrally located tension bar 12 with one end of the tension bar connected by springs 13 and 14 to an end connector bar 17, and the other end of the tension bar connected by springs 15 and 16 to an end connector bar 18. The springs enable the base 11 to resiliently bias in an axial direction of the base when a tensile force is exerted on the base. It is appreciated that while two springs are shown connecting each end of the tension bar 12 to the end connector bars 17 and 18, one or more springs may be used instead to connect to each of the end connector bars. It is also appreciated as an alternative to springs that a suitably resiliently biasing material may be used for the tension bar 12 to enable a direct connection of the tension bar to the elongated bow spring 20. The base 11 is preferably constructed from a material having a large strain at yield point, such as titanium, and the tension bar 12, springs 13–16, and end connector bars 17, 18 are preferably integrally formed from a single block of material, such as by machining, etching, etc.

As shown in FIGS. 1 and 3, the tension bar 12 has a hollow cavity 19 along a segment of the tension bar which reduces the cross-sectional area of the tension bar along the segment. The tension bar 12 also has a slotted groove 27 down the center communicating between the hollow cavity 19 and the ends of the tension bar. And the end connector bars 17 and 18 also have slotted grooves 28 and 29, respectively, in line with the longitudinal axis. As shown in FIG. 3, the slotted grooves 27–29 enable a strain sensor to be centrally routed to the hollow cavity for detecting axial strains in the base generally, and specifically along the reduced cross-sectional area of the tension bar 12. In particular, a fiber-optic based Fabry-Perot interferometer strain sensor may be used as the strain sensor, having an extrinsic axial strain sensing component 30 located in the hollow cavity 19, and an optic fiber 31 seated in the slotted grooves 27 and 28. The use of an extrinsic Fabry-Perot interferometer strain sensor for readout enables an absolute measure of strain and a resolution better than 0.5 microstrain. It is appreciated in an extrinsic sensor, the fiber plays no role in the sensing mechanism and only serves to bring the light to and from an external Fabry-Perot cavity where the light is modulated. For a gauge that is scaled for 300 microstrain the resolution is 1.6 micrometers for a gap range of one millimeter.

The bow spring 20 has a generally arcuate configuration, with ends 21, 22 connected to the end connector bars 17 and 18 of the base 11, and a middle section 23 which is bowed away and spaced from the base to form a gap 24 therebetween. In particular, the end connector bars 17 and 18 are shown each having a groove for seating one of the ends 21 and 22 of the bow spring 20. The middle section 23 may be characterized as the focus or focal point for applying a force on the bow spring 20 so that a tensile force and axial strain are produced in the base 11 via the end connector bars 17, 18. The bow spring 20 is made from a suitably rigid material, such as carbon fiber, for transmitting a tensile force to the base ends, but which is also suitably flexible to support a change in separation distance between the two ends 21 and 22. A cap 25 is also preferably connected over the bowed middle section 23 to come in contact with one of two surfaces defining a physical gap to be measured. The cap 25 protects the carbon fiber in the bow spring 20 from abrasions and separation. The cap 25 is preferably made of a lightweight metal, such as aluminum, with a low friction surface to minimize the effects of errors induced by friction.

The gap gauge 10 may be placed between two surfaces (not shown) defining a physical gap width to be measured. In particular, the cap 25 is placed to contact a first one of the two surfaces, and a bottom surface of the base 11 is placed to contact the second one of the two surfaces. Thus the physical gap width to be measured extends from the top contact surface of the cap 25 to the bottom surface of the base 11, and the gap gauge has an absolute displacement range from zero up to the width of the gap 24 between the middle section 23 and the base. In order to meet the maximum dimensional requirements discussed above, a preferred embodiment of the gap gauge may have an absolute displacement range of from 0 to 1 millimeter. It is notable that the gap gauge 10 may be attached to the two surfaces at one of three possible attachment points, including the cap, or either one of the end connector bars. It is preferable, however, for two of the three attachment points be free to enable some amount of movement, such as for example by at least 0.6 millimeter. A low friction surface at the base and cap is desirable to minimize the effects of errors induced by friction.

When a force is applied on the cap 25 to compress the bow spring 29 towards the base 11, the middle section 23 is displaced in a direction orthogonal to the base to reduce the gap width 24 between the middle section and the base. As a consequence, the ends 21, 22 of the bow spring 20 are spread apart to exert a tensile force on the base 11, including the tension bar 12, by expanding the base springs 13–16. And the tensile force is measured as axial strain by the fiber optic strain sensor. The hollow cavity 19 of the tension bar 12 is to allow for strain adjust at the minimum gap position. It is appreciated the gap gauge 10 may be utilized for relative displacement measurements, as well as absolute gap width measurements. In the case of measuring the absolute gap width, a predetermined axial strain is chosen as a reference at a predetermined reference gap width. For example, the open gap position is zero strain for a two-millimeter physical gap, i.e. height of the cap 25 plus uncompressed bow spring 20 plus base 11, and the closed gap position is maximum strain for a one-millimeter physical gap, i.e. height of the cap 25 plus compressed bow spring 20 (width of gap 24 is zero) plus base 11. It is appreciated that the "gap width" which is measured may be either the width of the gap 24 between the middle section 23 and the base 11, or the physical gap between the two surfaces, since the latter is simply the gap 24 plus the height/thickness dimensions of the cap, bow spring and base.

While particular operational sequences, materials, temperatures, parameters, and particular embodiments have been described and or illustrated, such are not intended to be limiting. Modifications and changes may become apparent to those skilled in the art, and it is intended that the invention be limited only by the scope of the appended claims.

We claim:

1. A gap gauge comprising:
   an elongated base having a pair of ends, and at least a portion of the base capable of resiliently biasing in an axial direction;
   an elongated bow spring having a pair of ends each connected to a corresponding one of the base ends, and a middle section bowed away from the base to define a gap therebetween, said bow spring capable of producing an axial strain in the base proportional to a displacement of the middle section in a direction orthogonal to the base; and
   a strain sensor connected to measure the axial strain in the base, whereby the displacement of the middle section may be indirectly determined from the measurement of the axial strain in the base.

2. The gap gauge of claim 1,
   wherein the bow spring is connected to produce a predetermined reference axial strain in the base at a predetermined reference gap width, whereby the gap width may be indirectly determined from the measurement of the axial strain in the base.

3. The gap gauge of claim 2,
   wherein the bow spring is connected to produce zero axial strain in the base at an open gap position associated with a maximum gap width and a maximum axial strain in the base at a closed gap position associated with a zero gap width.

4. The gap gauge of claim 1,
   wherein the base is made of titanium.

5. The gap gauge of claim 1,
   wherein the base includes a tension bar and at least one spring connecting opposite ends of the tension bar to the bow spring ends.

6. The gap gauge of claim 5,
   wherein the tension bar and the at least one spring are integrally formed.

7. The gap gauge of claim 5,
   further comprising a pair of end connector bars linking the springs to the bow spring ends.

8. The gap gauge of claim 7,
   wherein dual springs connect each end of the tension bar to a corresponding one of the end connector bars.

9. The gap gauge of claim 5,
   wherein at least a segment of the tension bar has a hollow cavity which reduces the cross-sectional area of the tension bar along the segment, and the strain sensor is located in said hollow cavity.

10. The gap gauge of claim 9,
    wherein the tension bar has an axially slotted groove communicating between the hollow cavity and one end of the tension bar, and the strain sensor is a fiber optic strain sensor having an optic fiber seated in said axially slotted groove and a strain sensing component located in the hollow cavity at an end of the optic fiber.

11. The gap gauge of claim 10,
    wherein the fiber optic strain sensor is a Fabry-Perot interferometer strain sensor.

12. The gap gauge of claim 1,
    wherein the bow spring is made of carbon fiber.

13. The gap gauge of claim 1,
    further comprising a cap connected over the bowed middle section.

14. The gap gauge of claim 13,
    wherein the cap is made of aluminum.

15. A fiber optic gap gauge comprising:
    a base having an elongated tension bar with at least a segment thereof having a hollow cavity forming a reduced cross-sectional area, a pair of end connector bars adjacent opposite ends of the tension bar, and at least one spring connecting each end of the tension bar to a corresponding one of the end connector bars;
    an elongated bow spring having a pair of ends each connected to a corresponding one of the pair of end connector bars of the base, and a middle section bowed away from the base to define a gap therebetween, said bow spring capable of producing an axial strain in the tension bar proportional to a displacement of the middle section in a transverse direction to the base; and
    a fiber-optic Fabry-Perot interferometer strain sensor located in the hollow cavity to measure axial strain along the segment of the tension bar with the reduced cross-sectional area, whereby the transverse displacement of the middle section may be indirectly determined from the measurement of the axial strain in the tension bar.

16. The fiber optic gap gauge of claim 15,
    wherein the bow spring is connected to produce a predetermined reference axial strain in the base at a predetermined reference gap width, whereby the gap width may be indirectly determined from the measurement of the axial strain in the base.

17. The fiber optic gap gauge of claim 16,
    wherein the bow spring is connected to produce zero axial strain in the base at an open gap position associated with a maximum gap width and a maximum axial strain in the base at a closed gap position associated with a zero gap width.

18. The fiber optic gap gauge of claim 15,
    wherein the base is made of titanium.

19. The fiber optic gap gauge of claim 15,
    wherein the tension bar and the at least one spring are integrally formed.

20. The fiber optic gap gauge of claim 15,
    wherein dual springs connect each end of the tension bar to a corresponding one of the end connector bars.

21. The fiber optic gap gauge of claim 15,
    wherein the tension bar has an axially slotted groove communicating between the hollow cavity and one end of the tension bar, and the strain sensor is a fiber optic strain sensor having an optic fiber seated in said axially slotted groove and a strain sensing component located in the hollow cavity at an end of the optic fiber.

22. The fiber optic gap gauge of claim 21,
    wherein the end connector bar adjacent the tension bar end with the axially slotted groove also has an axially slotted groove for passing communicating between the hollow cavity and one end of the tension bar, and the strain sensor is a fiber optic strain sensor having an optic fiber seated in said axially slotted groove and a sensor component located in the hollow cavity at an end of the optic fiber.

23. The fiber optic gap gauge of claim 15,
wherein the bow spring is made of carbon fiber.

24. The fiber optic gap gauge of claim 15,
further comprising a cap connected over the bowed middle section.

25. The fiber optic gap gauge of claim 24,
wherein the cap is made of aluminum.

26. A gap gauge comprising:
a base having a pair of ends, and at least a portion of the base capable of resiliently biasing in an axial direction;
means having a focal point transversely spaced from the base to define a gap therebetween and a pair of arms connecting the focal point to the base ends, for producing a tensile force and an axial strain in the base proportional to a displacement of the focal point in a direction orthogonal to the base due to an applied force thereon; and
a strain sensor connected to measure the axial strain in the base, whereby the orthogonal displacement of the fulcrum may be indirectly determined from the measurement of the axial strain in the base.

27. The gap gauge of claim 26,
wherein the means for producing a tensile force and an axial strain in the base is an elongated bow spring having a middle section bowed away from the base to define the gap therebetween.

* * * * *